United States Patent
Konchan et al.

(10) Patent No.: US 8,267,464 B2
(45) Date of Patent: Sep. 18, 2012

(54) LATCHING SYSTEM

(75) Inventors: Jeffrey L. Konchan, Romeo, MI (US); Balakrishna Chinta, Troy, MI (US); Louis J. Conrad, Attica, MI (US); Ronald P. McKenney, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/873,609

(22) Filed: Sep. 1, 2010

(65) Prior Publication Data

US 2012/0049580 A1 Mar. 1, 2012

(51) Int. Cl.
*B60J 5/04* (2006.01)
*E05C 1/08* (2006.01)

(52) U.S. Cl. ............. 296/146.6; 292/150; 292/DIG. 21; 292/DIG. 23

(58) Field of Classification Search .................. 292/144, 292/DIG. 23, 150, 341.15, DIG. 21; 296/146.6
See application file for complete search history.

(56) References Cited

U.S. PATENT DOCUMENTS

| | | | | |
|---|---|---|---|---|
| 6,601,910 B1 * | 8/2003 | Duggan | .................. | 296/203.03 |
| 7,287,785 B2 * | 10/2007 | Schupp et al. | ................ | 292/216 |
| 7,320,495 B2 * | 1/2008 | Menke | ....................... | 296/146.1 |
| 2011/0221229 A1 * | 9/2011 | Rouhana et al. | ........... | 296/146.6 |

* cited by examiner

*Primary Examiner* — Dennis Pedder
(74) *Attorney, Agent, or Firm* — Quinn Law Group, PLLC

(57) ABSTRACT

A door latching system for a vehicle and method of latching are provided. The system includes a carrier and a receiver each connected to one of a door and a door interface. The latching system, when non-actuated, does not substantially protrude from the latching faces of the door and door interface into an opening therebetween. The latching system is adaptable to a vehicle defining a continuous access opening closed by independently openable and closeable doors. The latching member is actuated to move from a retracted position to a protracted position in response to a triggering event, which may be defined by a sensor. In the protracted position, the latching member engages the receiver and the carrier to operatively latch the door and door interface portion. A latching feature defined by the latching member may be selectively engageable with a retaining member when the latching member is in the protracted position.

18 Claims, 3 Drawing Sheets

LATCHING SYSTEM

TECHNICAL FIELD

The present invention relates to a latching system.

BACKGROUND

A latching mechanism or system is typically configured to include a latching or locking element, for example, a clevis, pin or bolt, which is engageable to a receiver on the member being engaged. The latching mechanism may be attached to a first member and the receiver may be attached to a second member such that the engagement of the latching element to the striker provides a latching force to latch the first member to the second member. The latching force provided by the engagement of the striker and the latching element must be sufficient to latch the first member to the second member under nominal or ordinary loading conditions. The latching mechanism, clevis or receiver may be subject to higher loading conditions, e.g., in excess of nominal loading conditions, which may be experienced, for example, during an impact event. These higher loading conditions may require that the latching system be configured to provide a latching force responsive to the higher loading conditions by, for example, increasing the size and strength of the latching elements, which may result in a latching system characterized by increased cost, weight and size, and increased packaging space requirements.

The first member and second member may be a vehicle door and a portion of the vehicle body, respectively, such that the vehicle door latches to the portion of the vehicle body, such as a door frame or body pillar. In vehicles having adjacent front and rear doors with opposing hinges, the first member and the second member may be the front door and rear door, respectively, such that the front and rear doors latch to each other. Vehicles having front and rear doors with opposing hinges on the same side of the vehicle and with no body pillar between the doors are typically designed so that the doors latch to one another, and are thus "dependent". That is, one vehicle door, usually the front door, must be unlatched from the rear door and opened before the rear door can be opened, and the rear door must then be closed before the front door can be closed. The doors are dependent so that one door can latch to the other door when the doors are closed, because there is no body pillar between the doors that the doors could otherwise latch to and be operated independently. In either configuration, elements of the latching mechanism may be visible and/or protrude from the door closing surface. The latching mechanism of the vehicle door may be subject to higher loading conditions, e.g., in excess of nominal loading conditions, which may be experienced, for example, during an impact event, requiring that the latching system be configured to provide a latching force responsive to the higher loading conditions, as previously discussed.

SUMMARY

A door latching system is provided which is adaptable for latching a door of a vehicle to an interface portion of the vehicle body or another door of the vehicle. The door latching system operatively attaches to the latching faces of a vehicle door and a door interface portion, and includes a latching member which, when unlatched, is retracted into an opening defined between the door in a closed position and the door interface portion. When refracted, the elements of the latching system do not substantially protrude from the latching face of the door and/or door interface portion to which the latching elements are operatively attached.

The vehicle has a body defining an access opening, and each door is arranged to selectively open and close at least a portion of the access opening. The vehicle may have doors which are operatively attached to the body with non-opposing hinges, e.g., each door is operatively attached by hinges to a portion of the vehicle body, which may be a body pillar, and is configured to latch on the opposite side of the door, to a portion of the vehicle body which may be a vehicle pillar, where the portions of the vehicle body and body pillar to which the doors are hinged and latchable at least partially define the respective door opening.

The latching system may be adaptable to a vehicle having independently opening and closing doors, which are hinged to a vehicle body with opposing hinges so that the doors substantially cover a continuous access opening defined by the vehicle body, and where the vehicle body and/or the continuous door opening may be characterized by the absence of a B-pillar. The first and second doors are "independently" openable and closeable, which means that each can be opened or closed regardless of the position of the other vehicle door. The first and second doors operatively latch to each other, e.g., the latching face of each door defines the door interface portion to which the other door latches. The first and second doors can be opened or closed "independently" due, in part, to the latching elements of the latching system being retracted into the door(s) and/or the interface portion of the vehicle body when unlatched, such that the latching elements do not substantially protrude from the closing surfaces and do not interfere with the opening and closing of either door.

The door latching system described herein includes a door and a door interface portion. The door defines a first latch face, and the door interface portion defines a second latch face such that when the first and second doors are in a closed position, the first and second latch faces define an opening therebetween. The door latching system further includes a first component, a second component and a latching member. One of the first component and the second component may be referred to as a carrier, and the other as a receiver. One of the first component and the second component, for example, the carrier is adapted to be operatively connected to one of the door and the door interface portion. The other of the first component and the second component, for example, the receiver, is adapted to be operatively connected to the other of the door and the door interface portion. In a non-actuated condition, the first component, the second component and the latching member do not substantially protrude from the respective latch face into the opening.

The latching member is configured to move from a retracted position to a protracted position when the latching member is actuated in response to a triggering event. In the protracted position, the latching member engages the receiver and the carrier to operatively latch the door and the door interface portion. The latching member may define a latching feature. A retaining member operatively connected to the receiver may be configured to be selectively engageable with the latching feature of the latching member when the latching member is in the protracted position.

The door latching system may include an actuator configured to cause the latching member to move to the protracted position when the actuator is activated in response to the triggering event. The actuator may be configured as, for example, a pyrotechnic actuator, a spring-loaded actuator, a mechanical actuator, an electromechanical actuator, an electromagnetic actuator, or an electronic actuator.

The latching member may be further configured to move from the protracted position to the retracted position in response to a releasing event. The latching system may include a retracting member adapted to the carrier and configured to be selectively engageable with the latching feature of the latching member when the latching member is in the retracted position, and further configured such that the carrier may selectively disengage the retracting member from the latching feature in response to the triggering event.

The triggering event may be an impact event, an indication of an impact event, a prediction of an impact event, or a combination thereof; such that operatively latching the door to the door interface portion provides a latching force to resist an opening force resultant from the impact event. One or more sensors in operative communication with the door latching system may define the triggering event. One or more of the sensors may be configured as, for example, an air bag sensor, an impact sensor, an accident avoidance sensor, and a vehicle security system sensor.

A method of latching a vehicle door and a door interface portion of the vehicle is described herein. The method includes providing a triggering event to a latching system including a first component operatively attached to one of the vehicle door and the door interface portion, a second component operatively attached to the other of the vehicle door and the door interface portion and a latching member. The method further includes actuating the latching member in response to the triggering event and moving the latching member from a retracted position to a protracted position to engage the first component and the second component and to operatively latch the door and the door interface portion.

Providing the triggering event may include receiving a signal from one or more sensors, wherein the triggering event is defined by the signal. Moving the latching member from the refracted position to the protracted position to engage the carrier and the receiver may include engaging a latching feature and a retainer member. Actuating the latching member in response to the triggering event may include activating an actuator, where the actuator is in operative communication with the carrier and configured to cause the latching member to move to the protracted position when the actuator is activated. The method may further include moving the latching member from a protracted position to a retracted position in response to a releasing event, thereby disengaging the carrier and the receiver to operatively unlatch the door and the door interface portion.

The door latching system described herein provides a system and method to selectively latching a door and door interface portion, which may be another door, to provide a latching force to oppose a force, which may be an opening force or an impact force. The side impact resistance of the vehicle door may be selectively improved by latching the door to surrounding structure, such as the vehicle body defining the door interface portion or another door, in response to a triggering event.

The door latching system is configured to be attached to the latch faces of the door without hindering or interfering with normal door operation, and may be used as a supplementary latching system in conjunction with a conventional door latching mechanism. In a non-actuated condition, the latching system elements including the receiver, carrier and latching member do not substantially protrude from the latch faces into the opening defined therebetween, such that the latching system may be adapted to independently-opening opposed hinged doors, and such that the appearance of the door face and door interface portion, e.g., door frame, is improved by the absence of protruding latch hardware.

The above features and other features and advantages of the present invention are readily apparent from the following detailed description of the best modes for carrying out the invention when taken in connection with the accompanying drawings.

DETAILED DESCRIPTION

Figure 1:
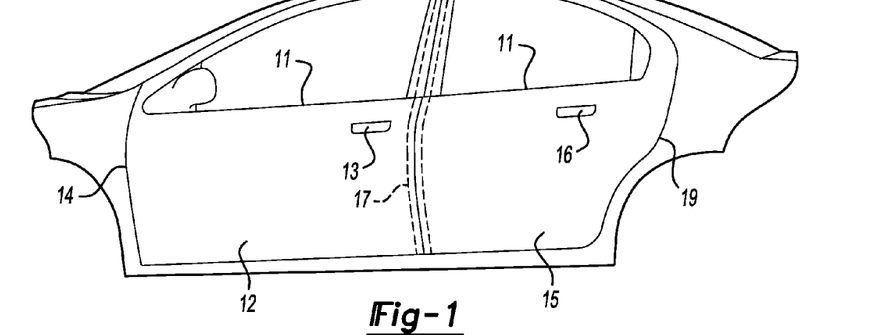
FIG. 1 is a schematic side view illustration of a vehicle having front and rear doors with non-opposing hinges mounted to the vehicle body.

Referring to the drawings wherein like reference numbers represent like components throughout the several figures, and beginning with FIG. 1, a portion of a vehicle 10, including a door latching system, is shown. The elements shown in FIGS. 1-10C are not to scale. Accordingly, the particular dimensions and applications provided in the drawings presented herein are not to be considered limiting.

The vehicle 10 shown in FIG. 1 includes an access opening which is defined by door interface portions 14, 19 of the vehicle 10, and which is further defined by a pillar 17, typically referred to as the B-pillar, which subdivides the access opening into a front and a rear door opening for attaching a first or front door 12, and a second or rear door 15, respectively. Each door 12, 15 is arranged to selectively open and close its respective door opening. The doors 12, 15 are configured with non-opposing hinges, e.g., each door 12, 15 is operatively attached by hinges (not shown) adapted to, typically, the front-facing portion of each door to a portion of the vehicle body and is further configured to latch on another, typically rear-facing portion of the door, to a portion of the vehicle body. In the non-limiting example shown in FIG. 1, the front door 12 is operatively attached to an interface portion 14 of the body of vehicle 10 at its front-facing side, and is configured to latch to an interface portion of the vehicle pillar 17 on its rear-facing side, where, as will be described in further detail, the rear-facing side of front door 12 and the door interface portion of the pillar 17 each define a respective latching face of the latching system of the front door 12. The rear door 15 is operatively attached to the vehicle pillar 17 at its front-facing side, and is configured to latch to an interface portion 19 of the body of vehicle 10 on its rear-facing side where, as will be described in further detail, the rear-facing side of front door 15 and the interface portion 19 of the body of vehicle 10 each define a respective latching face of the latching system of the rear door 15. The pillar 17 may be, for example, the B-pillar of vehicle 10, and may be covered by doors 12, 15 when doors 12, 15 are in a closed position, so as not to be visible from the exterior of vehicle 10, as shown in FIG. 1. Each door 12, 15 may include a respective door handle 13, 16, which may be used in opening and closing the respective door. The doors 12, 15 further each define a respective belt line 11.

Figure 2:
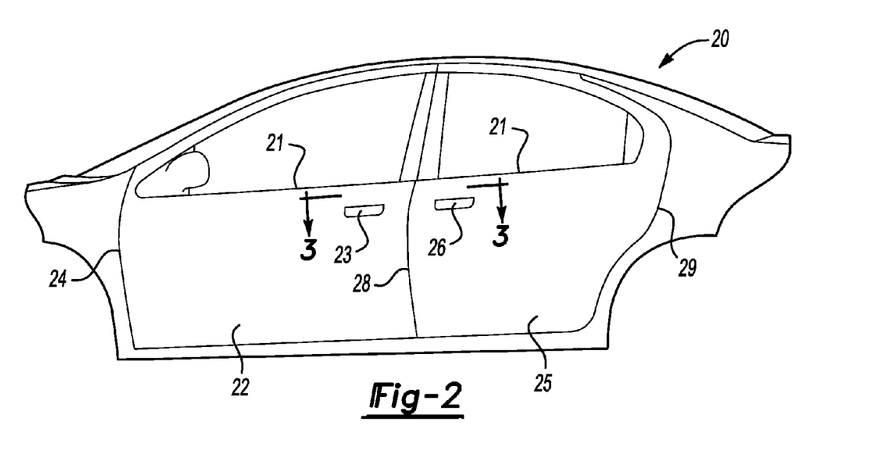
FIG. 2 is a schematic side view illustration of a vehicle having front and rear doors with opposing hinges mounted to the vehicle body.

FIG. 2 shows a vehicle 20 which has independently opening and closing doors 22, 25, which are hinged to the body of vehicle 20 with opposing hinges so that the doors 22, 25 substantially cover a continuous door opening defined by the vehicle body including door attachment portions 24, 29. The first and second doors 22, 25 are "independently" openable and closeable, which means that each can be opened or closed regardless of the position of the other vehicle door. The first and second doors 22, 25 can be opened or closed "independently" due, in part, to the latching elements of the latching system being refracted into the door(s) and/or portion of the vehicle body when unlatched such that the latching elements do not substantially protrude from the closing surfaces 37, 38 (see FIG. 3) so as to interfere with the opening and closing of either door 22, 25. The door opening is "continuous" as there is no body pillar, such as a B-pillar, between the vehicle doors 22, 25. Both doors 22, 25 are therefore required to be closed to close out a continuous door opening as opposed to a typical arrangement in which one door closes a door opening. Thus, when the doors 22, 25 are both closed, they fully close out the door opening and form a cutline and/or generally slot-like opening 28 (see FIG. 3) therebetween.

The vehicle 20 shown in FIG. 2 includes a continuous access opening which is defined by the door interface portions 24, 29 of the vehicle 20. As discussed herein in further detail, the vehicle 20 is characterized by the absence of a B-pillar, and each door 22, 25 is arranged to selectively partially open and close the continuous access opening. The access opening is fully closed from the door interface portion 24 to the door interface portion 29 by the first or front door 22 and the second or rear door 25 when both the doors 22, 25 are in a closed position. The access opening is continuously open from the door interface portion 24 to the door interface portion 29 when the doors 22, 25 are both in an open position. The doors 22, 25 shown in FIG. 2 are configured with opposing hinges, e.g., each door 22, 25 is operatively attached to the access opening by hinges (not shown) adapted to the opposing facing sides of the respective door, such that the doors 22, 25, are openable to provide a continuous access opening. In the non-limiting example shown in FIG. 2, the front door 22 is operatively attached to an interface portion 24 of the body of vehicle 20 at the front-facing side of door 22. In the opposing configuration, the rear door 25 is operatively attached to an interface portion 29 of the body of vehicle 20 at the rear-facing side of door 25. Further, front door 22 is configured to latch to a door interface portion on the front-facing side of rear door 25, and vice-versa, e.g., rear door 25 is configured to latch to a door interface portion on the rear-facing side of front door 22, such that in a latched position, door 22 latches to door 25, and each door defines a door interface portion for the other. As will be described in further detail, the rear-facing side of front door 22 and the front-facing side of rear door 25 each define a respective latching face 37, 38 (see FIG. 3) of the latching system of vehicle 20, and an opening 28 (see also FIG. 3) therebetween. Each door 22, 25 may include a respective door handle 23, 26, which may be used in opening and closing the respective door. The doors 22, 25 further each define a respective belt line 21. Section 3-3 of FIG. 2 is a section taken across the latching faces of doors 22, 25 when doors 22, are in a closed position.

Figure 3:
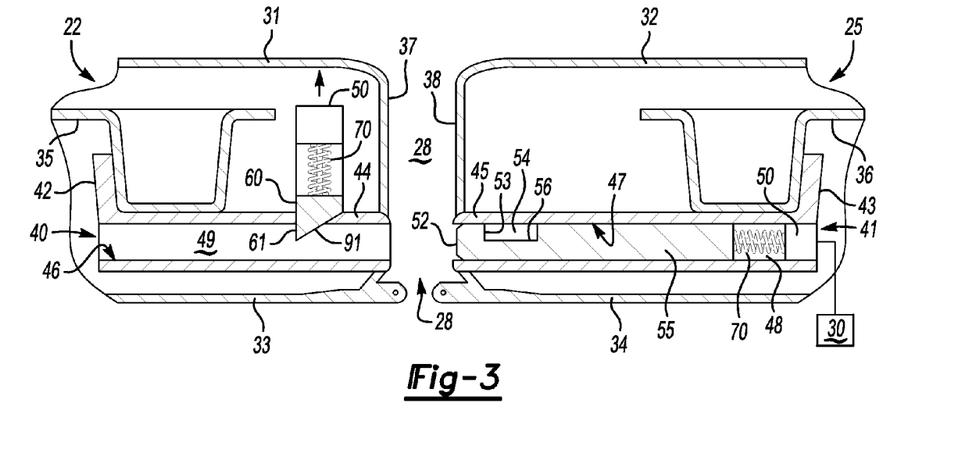
FIG. 3 is a partial sectional schematic view of a vehicle door system including a latching system with a latching member in a retracted position taken at lines 3-3 in FIG. 2.

FIG. 3 shows a partial sectional schematic view of a door latching system configured to latch a door and a door interface portion taken through a section 3-3 (see FIG. 2). For purposes of illustration, the latching system is shown as configured for the vehicle 20 of FIG. 2, adapted to latch the front door 22 to the rear door 25, such that the respective door interface portion latching with each door 22, 25 is defined by the respective opposing door 25, 22. It would be understood that the door latching system shown in FIG. 3 is adaptable to the vehicle 10 shown in FIG. 1 and may be configured to latch the front door 12 and a respective door interface portion 17 and to latch the rear door 12 and a respective door interface portion 19.

FIG. 3 shows the door latching system adapted for latching the independent front and rear doors 22, 25 of vehicle 20. The front door 22 includes an interior-facing surface 31, and an exterior-facing surface 33, where interior-facing and exterior-facing are with respect to the vehicle, e.g., the interior-facing surface is inboard and is visible from the interior of vehicle 20, and the exterior-facing surface is outboard and is visible from the exterior of the vehicle, when the door 22 is in a closed position. The front door 22 further includes a door edge portion 37, which may also be referred to as a substantially vertical door edge, a latching surface or a latch face. Latch face 37 defines the door interface portion to which door 25 may be operatively latched. Vertical and horizontal, as used herein, are defined with respect to the general orientation of the vehicle, e.g., horizontal is defined as parallel to a plane generally parallel to the floor pan of the vehicle, or to a plane generally defined by the ground or road surface upon which the vehicle is positioned during normal operation, and vertical is defined as perpendicular to that horizontal plane. The front door 22 may further include an inner panel 35, which may be a structural or reinforcing panel or inner frame within the shell of door 22 defined by the surfaces 31, 33, and 37. Similarly, the rear door 25 includes an interior-facing surface 32, an exterior-facing surface 34, and a latch face 38 and may include an inner panel 36. Door 22 may be operatively latched to the door interface portion defined by latch face 38. An opening 28 is defined by the latch faces 37 and 38. The opening 28 may also define a cut line (see FIG. 2) between the adjacent edges of exterior door surfaces 33, 34 when doors 22, 25 are in a closed position.

The door latching system includes a first component and a second component. One of the first component and the second component may be referred to as a carrier 41, and the other may be referred to as a receiver 40. The carrier 41, in the non-limiting example shown, is operatively attached or mounted to the door 25, and to the latch face 38 such that the carrier 41 does not substantially protrude beyond the latch face 38 and into the opening 28. The carrier 41 may be operatively attached to the inner panel 36, to provide additional strength, rigidity, or support to the carrier 41 and the latching system. The carrier 41 includes a carrier housing 43. The carrier housing 43 defines an inner surface 47 and the inner surface 47 defines an inner carrier passage 48. A nose portion 45 of the housing 43 may be in proximate contact with the latch face 38 to define an opening through the latch face 38 and into the passage 48 of the carrier 41. The nose portion 45 may be positioned in proximate contact with, or operatively attached to, the latch face 38 such that the nose portion 45 is generally flush with the latch face 38 and does not substantially protrude into the opening 28.

The carrier 41 further includes a latching member 55. The carrier 41 may be configured to actuate the latching member 55 to cause the latching member 55 to move from the retracted position shown in FIG. 3 to a protracted position in FIG. 4. Latching member 55 is configured to be actuable, and may be actuated, for example, in response to a triggering event. By way of non-limiting example, the latching member may be configured as or described by terms such as a bolt, a rod, a locking member, a pin, a clevis, and a hook. The carrier 41 may be in operative communication with an actuator 50. The latching member 55 may be operatively connected to or in operative communication with the actuator 50, for example, via an actuating element 70. The latching member 55 is slidably moveable in carrier passage 48, and includes a nose portion 52, which may be defined by a chamfer 51 or other modified edge (see FIG. 10A) to facilitate the sliding movement of the latching member 55 in the carrier passage 48 and, in a protracted position, into the passage 49 of the receiver 40. The latching member 55 may further include a latching element or feature 54, which may be defined by a surface 56 and a shoulder or hook portion 53 of the latching member 55.

The receiver 40, in the non-limiting example shown, is operatively attached or mounted to the door 22, and to the latch face 37 such that the receiver 40 does not substantially protrude beyond the latch face 37 and into the opening 28. The receiver 40 may be operatively attached to the inner panel 35, to provide additional strength, rigidity or support to the receiver 40 and the latching system. The receiver 40 includes a receiver housing 42. The receiver housing 42 defines an inner surface 46 and the inner surface 46 defines an inner receiver passage 49. A nose portion 44 of the housing 42 may be in proximate contact with the latch face 37 to define an opening through or in the latch face 37 and to the passage 49 of the receiver 40. The nose portion 44 may be positioned in proximate contact with, or operatively attached to, the latch face 37 such that the nose portion 44 is generally flush with the latch face 37 and does not substantially protrude into the opening 28.

The receiver 40 further includes a retaining member 60. The retaining member 60 may be operatively connected to or in operative communication with the receiver 40. The retaining member 60 may be defined by one or more surfaces 61, 91 and may be configured to be selectively engageable with the latching feature 54. In the non-limiting example shown in FIGS. 3 and 4, the retaining member or catch 60 is configured generally as a wedge defining a bevel surface 91 and shoulder or catch face 61. The retaining member 60 may be configured as or described by terms such as a catch, a wedge, a lever, a pin, a hook, and a pawl.

FIG. 3 shows the latching system with latching member 55 in a retracted position, e.g., latching member 55 is located in carrier passage 48 such that latching member 55 does not protrude from carrier housing 43, e.g., the nose 52 of the latching member 55 does not substantially protrude from the opening of the carrier housing 43 defined by the nose portion 45, and is not protracted or extended from the carrier housing 43 into the opening 28. The latching member 55 may be in a retracted position when, for example, the latching system has not been actuated such that the latching member 55 is in a non-actuated position, which is the retracted position. The latching member 55 may also be in a retracted position when, for example, the latching member is subsequently retracted to unlatch the doors 22, 25 after being actuated and moving to the protracted position shown in FIG. 4.

Figure 4:
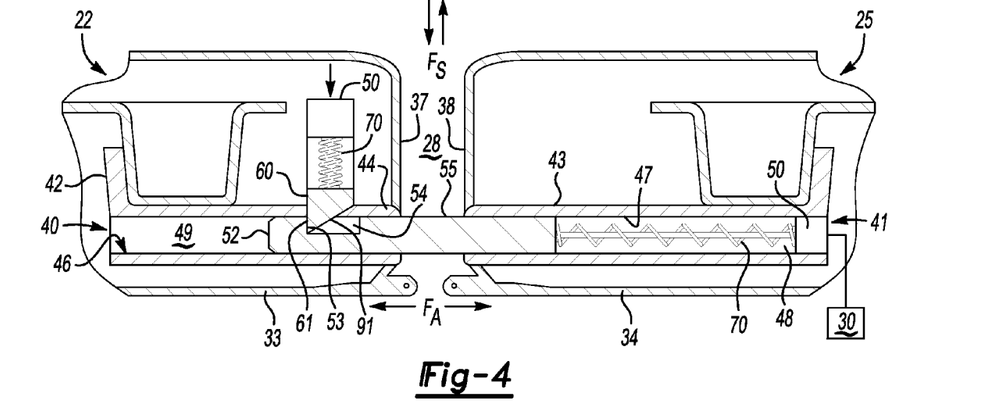
FIG. 4 is a partial sectional schematic view of the latching system of FIG. 3 with the latching member in a protracted position and engaged.

FIG. 4 shows the latching system with the latching member 55 in a protracted position, e.g., the latching member 55 is located partially in the carrier passage 48 and partially in the receiver passage 47 such that the latching member 55 engages the receiver 40 and carrier 41 and thereby operatively latches door 22 and door 25. The latching member 55 may be actuated to move from the retracted position shown in FIG. 3 to the protracted position shown in FIG. 4, therefore the protracted position shown in FIG. 4 may also be referred to as the actuated position of the latching member 55. As shown in FIG. 4, when the latching member 55 is protracted to engage with the receiver 40, the retaining member 60 may selectively engage with the latching feature 54 of the latching member 55. The retaining member 60 is configured and adapted to the receiver 40 such that the retaining member 60 may be selectively moveable or displaceable in the direction of the arrow shown in FIG. 3 so as to not impede the movement of the latching member 55 in the receiver passage 49 and to the protracted position shown in FIG. 4.

As shown in FIGS. 3 and 4, the latching feature 54 is defined by the surface 56 and the shoulder or hook 53 of the latching member 55. The latching feature 54 may be generally configured as one of a recess, a cavity, a slot, a groove, an undercut, a hole, an opening, and a loop. In the non-limiting example shown in FIGS. 3 and 4 and in additional detail in FIG. 10A, the latching member 55 may be a generally rectangular member or bolt, where the latching feature 54 is generally configured as a slot or undercut portion defined by the surface 56 (see FIG. 10A). The latching feature 54 may define a shoulder or hook 53, which provides a catch face to engage with a surface of the retaining member 60 to retain the latching member 55 in the receiver passage 49, thereby engaging the receiver 40 and the carrier 41 and providing a latching force to latch the door 22 and the door interface portion, which in FIG. 3, is the door 25.

The retaining member or catch 60 is further configured and adapted to the receiver 40 such that the retaining member 60 may be selectively moveable or displaceable in the direction of the arrow shown in FIG. 4 so as to be selectively engageable with the latching feature 54 when the latching member 55 is in the protracted position shown in FIG. 4. For example, the retaining member 60 may be generally wedge shaped and may be spring loaded or otherwise adapted such that as the nose 52 of the latching member 55 contacts the bevel 91, the retaining member 60 is moved in the direction of the arrow shown in FIG. 3. As the latching member 55 continues to move in the passage 49 to its protracted position, the retaining member 60 may be adapted such that it moves in the direction of the arrow shown in FIG. 4 to engage the latching feature 54 such that the catch face 61 is in proximate contact with the shoulder 53 of the latching feature 54.

FIG. 4 shows the latching system in a latched condition, such that the latching member 55 has been actuated by the carrier 41 to move slidably within the passage 48 of the carrier, to extend into and across the opening 28 and to enter the receiver passage 49 through the passage opening defined by the nose portion 44. As discussed previously, as the latching member 55 extends or protracts into the passage 49, the retaining member 60 selectively moves away from the passage 49 so as not to impede the protraction of the latching member 55, then, when the latching member 55 is in the protracted position, the retaining member 60 selectively moves into the passage 49 to engage with the latching feature 54. In the protracted position, the latching member 55 is in proximate contact at one end with the carrier 41 at passage 48 and in proximate contact at the other end with the receiver 40 at passage 49, such that the latching member 55, the receiver 40 and the carrier 41 are operatively engaged, the door 22 and the door 25 are operatively latched, and a latching force is provided by the latching system thus configured.

The latching force provided by the engagement of the latching member 55, the receiver 40 and the carrier 41 and the latching force provided by the engagement of the retaining member 60 and the latching feature 54 oppose an opening force which may be introduced to the latching system and/or doors 22, 25 during an opening attempt. The opening force may be, for example, an impact force resulting from an impact event. The opening force may be comprised of a shear force ($F_S$) and an axial force ($F_A$), as shown in FIG. 4, or a combination thereof. As would be understood, the "axial" force references the opening or separation force imposed on the latching system along an axis defined by the longitudinal axis of latching member 55 while in a protracted position engaging passages 48, 49. When the latching member 55 is in the protracted position, the latching force provided by the engagement of the retaining member 60 and the latching feature 54 is available to primarily oppose the axial force element $F_A$ of the opening force. When the latching member 55 is in the protracted position, the latching force provided by the engagement of the latching member 55, the receiver 40 and the carrier 41 is available to primarily oppose the shear force element $F_S$ of the opening force. The engagement of the latching member 55 with the receiver 40 and the carrier 41, when each of the receiver 40 and the carrier 41 are operatively attached to respective inner panels 35, 36 (see FIG. 3) of respective doors 22, 25, may also contribute to increased side impact resistance of the doors by selectively connecting each door to its surrounding structure in response to a triggering event defined by an impact event.

Figure 5:
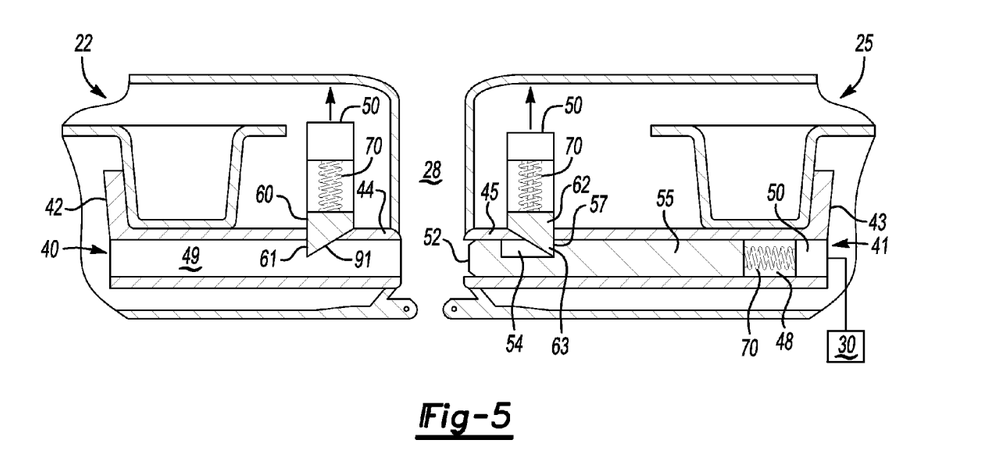
FIG. 5 is a partial sectional schematic view of an alternate construction of the latching system of FIG. 3.

Carrier 41 is configured to actuate latching member 55 to cause latching member 55 to move from a first or retracted position in passage 48 to a second or protracted position, where latching member 55 is engaged with passage 49 and passage 48. Latching member 55 may be actuated in response to a triggering event. The triggering event may be one of an opening attempt, an impact event, an indication of an opening attempt or an impact event, or a prediction of an opening attempt or an impact event. The triggering event may be provided to the latching system by any suitable means to actuate the latching member 55. For example, the triggering event may be configured as a signal from a sensor 30 as shown in FIGS. 3-5, or a controller (not shown), as an electrical signal, or as a mechanical or manual input. The triggering event may be provided to the latching system as an operator input, through a manual input, for example, by triggering an actuating switch such as a locking switch, or through operator input into, for example, a vehicle operating system to trigger the latching system when preselected conditions are present. Non-limiting examples of triggering events may include arming a vehicle occupant protection device, such as a front or side airbag, e.g., to place the vehicle occupant protection device in a ready state for deployment; deploying a vehicle occupant protection device, for example, by activating or firing an airbag; receiving input from an accident avoidance system, a vehicle security system or a vehicle impact sensor; manually triggering the latching system; experiencing preselected conditions triggering the latching system, etc.

The carrier 41 and/or latching member 55 may be in operative communication with an actuator 50 which may be configured, by way of non-limiting example, as a pyrotechnic, a spring-loaded, a mechanical, an electromechanical, an electromagnetic, and an electronic actuator, or a combination of these elements. For example, the actuator 50 may be configured to include a spring with a high spring load and a pyrotechnic firing device, which may be activated to cause the latching member 55 to move from a retracted position to the engaged, protracted position.

FIG. 5 shows a retracting member 62 operatively connected to the carrier 41, which may be in operative communication with the actuator 50 and/or the carrier 41, and/or configured to retract in response to a triggering event. The retracting member 62 defines a catch face 63 which is configured to be selectively engageable with a shoulder 57 of the latching feature 54 when the latching member 55 is in the retracted position in the carrier passage 48. The retracting member 62 may be used, for example, to oppose a high spring force provided by the actuating element 70, thereby retaining the latching member 55 in the retracted position. In the non-limiting example shown, retracting member 62 is configured similarly to retaining member 60, and may be configured as or described by terms such as a catch, a wedge, a lever, a pin, a hook, and a pawl. In response to a triggering event, retracting member 62 is moveable in a direction shown by the arrow in FIG. 5, such that latching member 55 may be actuated by, for example, the high spring load of the actuating element 70, to cause the latching member 55 to slidably move to the protracted position. The refracting member 62 may be activated by the actuator 50 or by other suitable means.

The actuator 50 may be configured to actuate the latching member 55 to move from a retracted position to a protracted position in response to a triggering event. The latching system and/or the actuator 50 may be in operative communication with one or more sensors 30, as shown in FIGS. 3-5, which may be vehicle sensors providing signals related to vehicle operating characteristics and conditions, where the signals may define a triggering event which is communicated to the latching system and/or actuator 50. The sensors 30 may include one or more of an air bag sensor, an impact sensor, an accident avoidance sensor, a door lock sensor, and/or sensor related to the vehicle's operating systems including the steering, braking, lighting, power train, safety and electrical systems. The latching system and/or actuator 50 may be in operative communication with one or more controllers (not shown) which may receive input from one or more sensors 30. The controller may be configured to process the input from the one or more sensors 30 to provide an output which defines a triggering event.

The carrier 41 and/or actuator 50 may be further configured to actuate latching member 55 to move from the protracted position to a retracted position in response to a releasing event, to cause the latching member 55 to operatively disengage from the receiver 40, thereby operatively unlatching the door 22 from the door 25. Retracting the latching member 55 from a protracted position may include engaging the retracting member 62 with the latching feature 54 to retain latching member 55 in a retracted position. A releasing event may be one of a cessation of a triggering event, the cessation of an indicator of a triggering event, the cessation of a predictor of a triggering event, a measurement or indicator of the magnitude of the event such as a signal from a sensor 30, which may be configured as an impact sensor indicating minimal impact force was sustained by the vehicle, an input from a manual release or unlatch switch, etc.

A method is described herein to latch a vehicle door and a door interface portion of the vehicle, which as shown in FIG. 1, describes a method to latch a respective door 12, 15 to a respective interface portion 17, 19 of a vehicle 10; and as shown in FIG. 2, describes a method to latch a respective door 22, 25 to a respective interface portion defined by the opposing door 25, 22 of a vehicle 20. The method includes providing a triggering event, which may be a triggering event as described previously herein. The method further includes moving the latching member 55 from a retracted position (see FIG. 3) to a protracted position (see FIG. 4) in response to the triggering event to engage a first component and a second component. One of the first component and the second component may be, for example, the receiver 40, and the other may be the carrier 41, where one of the first component and the second component may be operatively attached to one of the vehicle door and the door interface portion, and the other of the first component and the second component may be operatively attached to the other of the vehicle door and the door interface portion. The method further includes engaging the first component and the second component to operatively latch the door 22 and the door interface portion 25.

The method may further include receiving a signal from a sensor 30, which may be a vehicle sensor, where the sensor 30 may define the triggering event which is provided to actuate the latching member 55. The method may further include engaging a latching feature 54 and a retainer member 60 when the latching member 55 is actuated. The method may include activating an actuator 50 in operative communication with the latching member 55 in response to the triggering event. In a non-limiting example, the method may include providing a releasing event such that the latching member 55 is actuated and moves from the protracted position to the retracted position in response to the releasing event; thereby disengaging the carrier 41 and the receiver 40 and operatively unlatching the door 22 and the door interface portion 25.

Figure 6:
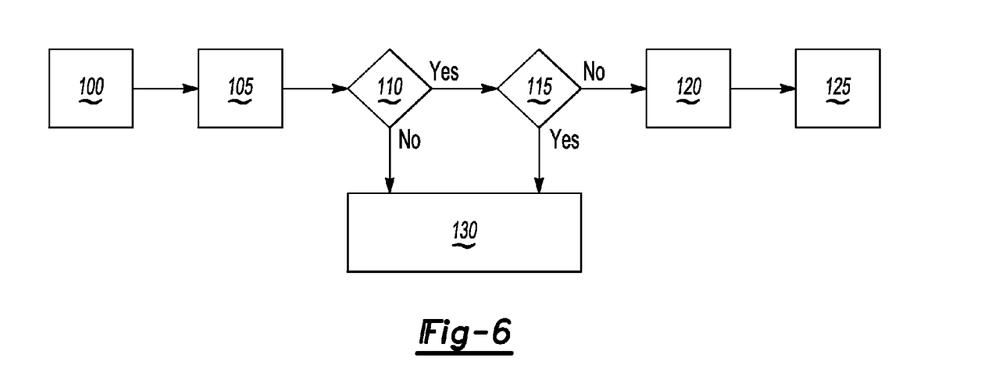
FIG. 6 is a flowchart depicting a method of providing additional latching force using the latching system of FIG. 3.

FIG. 6 depicts an alternate method for latching a vehicle door to a door interface portion using the latching system described herein, where during normal vehicle operating conditions the latching system is engaged, e.g., the doors 22, 25 are latched, and the latching system is selectively disengaged based on the method shown. The method of FIG. 6 may be used, for example, where the latching system as described herein is configured as the primary latching system to operatively latch the door and door interface portion. At a first step 100, the latching member 55 is actuated. Step 100 may occur when the vehicle is started, when the doors are locked by the operator using a door lock switch, or automatically when the vehicle achieves a minimum speed or as otherwise preset by the vehicle operating system, such that during normal operation of the vehicle the latching system is actuated and the doors 22, 25 are operatively latched. At step 105, the latching member 55 protracts to engage receiver 40 and carrier 41, thereby operatively latching doors 22, 25.

At step 110, a triggering event, as described previously, may be provided to the latching system. If no triggering event is provided at step 110, the latching system progresses to step 130. At step 130, the latching system may be disengaged, e.g., the latching member 55 may be retracted so as to disengage the carrier 41 and receiver 40, thereby unlatching doors 22, 25. Step 130 may occur, for example, when the vehicle is shutdown or turned off after normal operation, or when the doors are unlocked, for example, by the operator using a door lock switch. Continuing with step 110, if a triggering event is provided at step 110, which may indicate, for example, that an impact event has occurred or is predicted or anticipated to occur during vehicle operation, then the latching system remains actuated and progresses to step 115.

At step 115, a releasing event as described previously, may be provided to the latching system. If a releasing event is provided at step 110, the latching system progresses to step 130 and step 130 progresses as described previously. If no releasing event is provided at step 115, the latching system remains actuated and progresses to step 120. At step 120, an override input may be provided such that at step 125, the latching system 125 is disengaged, thereby unlatching the doors 22, 25. The sequence as described for FIG. 6 prevents the unlatching of doors 22, 25 when a triggering event has occurred without a subsequent releasing event, therefore limiting the unlatching of doors 22, 25 under the conditions described by requiring an override input to disengage the latching system. The override input may be, for example, a manual disengagement of the latching system using a lever operatively attached to the latching system and configured for that purpose.

As would be understood, alternate configurations for the mounting or attachment location and orientation of the latching system are possible. Also, multiple combinations of latching system elements to configure the latching system are possible. For example, and referring to FIG. 3, the mounting orientation of the latching system may be reversed, e.g., the carrier 41 may be operatively attached to the door 22 and the receiver 40 may be operatively attached to the door 25, with equivalent function. With respect to FIG. 1, the receiver 40 may be mounted in the door 12, 15 and the carrier may be mounted in the respective body interface portion 17, 19, or vice-versa. The mounting location may be modified, e.g., the carrier 41 and receiver 40, shown in FIGS. 1 and 2 as located below and proximate to the beltline 11, 21, may be moved horizontally to another location which may be proximate to the middle or bottom portion of the door so as to be proximate to the generally horizontal bottom portion of the door opening.

The orientation of the latching system may be modified, for example, such that the orientation of latching feature 54 of latching member 55, shown in FIG. 3 as generally facing toward the interior of vehicle 20, is modified so that the latching feature 54 is oriented to face toward the exterior of vehicle 20, toward the beltline 21 or toward the bottom portion of vehicle 20, or any orientation therebetween. It would be understood that the orientation of retaining member 60 would be modified so as to be engageable with latching feature 54 as previously described. The mounting location and orientation may be modified, for example, such that the latching system is adapted to latch the door to a generally horizontal portion of the vehicle body defining the door opening, for example, the latching system may be oriented and mounted such that the carrier and the receiver are in a generally vertical orientation, with one of the carrier and the receiver operatively attached to the bottom, generally horizontal edge of the door, and the other of the carrier and receiver operatively attached to the bottom, generally horizontal portion of the door frame defined by the vehicle body. A similar configuration may be used to attach the top of the door to the top of the door frame defined by the header or roof portion of the vehicle body.

Figure 7:
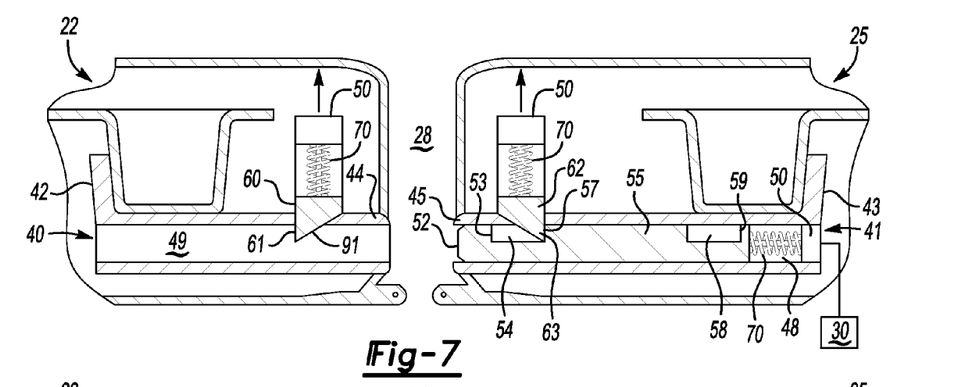
FIG. 7 is a partial sectional schematic view of an alternate construction of the latching system of FIG. 5 with the latching member in a retracted position.
Figures 8, 9A, 9B, 9C, 10A, 10B, 10C:
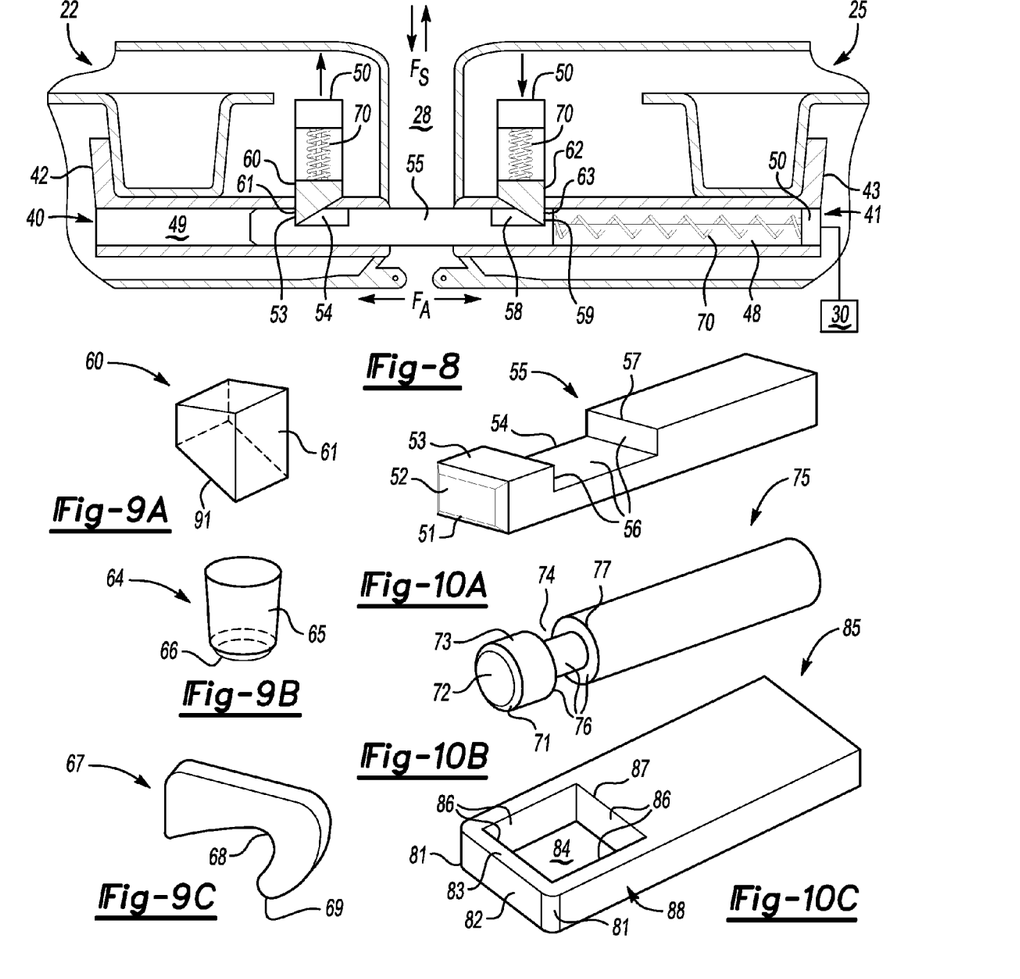
FIG. 8 is a partial sectional schematic view of the latching system of FIG. 7 with the latching member in a protracted position and engaged.
FIG. 9A is a schematic perspective illustration of a latching member of the latching system of FIG. 3.
FIG. 9B is a schematic perspective illustration of an alternate construction of the latching member of FIG. 9A.
FIG. 9C is a schematic perspective illustration of an alternate construction of the latching member of FIG. 9A.
FIG. 10A is a schematic perspective illustration of a latching member of a latching system of FIG. 3.
FIG. 10B is a schematic perspective illustration of an alternate construction of the latching member of FIG. 10A.
FIG. 10C is a schematic perspective illustration of an alternate construction of the latching member of FIG. 10A.

The features and elements of the latching system may be combined to provide additional configurations, such as the example configuration shown in FIGS. 7 and 8. In the latching system shown, latching member 55 defines a second latching feature 58 which includes a shoulder portion 59, and carrier 41 is configured as shown in FIG. 5, including the retracting member 62. FIG. 7 shows the latching system with the latching member 55 retracted, e.g., not actuated, where the latching member 55 is retained in the retracted position by selectively engaging the retracting member 62 in the latching feature 54. When actuated, the retracting member 62 moves in the direction shown by the arrow in FIG. 7, and the latching member is caused to slidably move in the passage 48 to engage the passage 49 of the receiver 40. FIG. 8 shows the latching system of FIG. 7 with the latching member 55 in the protracted, or actuated, position. In the protracted position shown in FIG. 8, the catch face 61 of retaining member 60 engages with the shoulder 53 of the latching feature 54, and retracting member 62 is selectively moved in the direction of the arrow shown in FIG. 8 such that the catch face 63 engages with the shoulder 59 of the latching feature 58. The engagement of the members 60, 62 with their respective latching features 54, 58 provides a latching force in opposition to an opening force $F_A$ which may be resultant from the triggering event. As discussed previously, the latching system may be configured such that the latching member 55 may be selectively retractable after protraction, in response to a releasing event. When a releasing event is provided, retaining member 60 is selectively moved in the direction of the arrow shown in FIG. 8 and latching member 55 is retracted by actuator 50, actuating element 70, or other suitable means.

As would be understood, alternate configurations for the latching member 55, the retaining member 60 and the retracting member 62 and combinations thereof are also possible. FIG. 9A shows the retaining member 60 configured generally as a wedge defining a bevel surface 91 and catch face 61, as shown in the non-limiting example of the latching system shown in FIGS. 3 and 4, and described previously herein. The retaining member 60 shown in FIG. 3 and the retracting member 62 shown in FIG. 5 may be configured as or described by terms such as a catch, a wedge, a lever, a block, a cylinder, a frustum, a bolt, a pin, a hook, and a pawl. Non-limiting examples of alternative configurations of the retaining member 60 and retracting member 62 are shown in FIGS. 9B and 9C. For example, FIG. 9B shows a retaining member 64 generally configured as a cylinder or truncated cone and defining an engaging surface or catch face 65, which may be selectively engaged with the latching feature of the latching member. Retaining member 64 may further be defined by a chamfer or rounded edge 66, to facilitate the smooth engagement of retaining member 64 and the latching feature. FIG. 9C shows another example configuration of a retaining member 67 generally configured as a pawl or hook and defining an engaging surface or catch face 68 and a hook or nose portion 69 which are configured to selectively engage the latching feature of the latching member.

FIG. 10A shows the latching member 55 configured as shown in the non-limiting example of the latching system shown in FIGS. 3 and 4, and described previously herein. The latching member may be configured as or described by terms such as a bolt, a rod, a locking member, a pin, a clevis, and a hook, and the latching feature may be configured as or described by terms such as a recess, a cavity, a slot, a groove, an undercut, a hole, an opening, a clevis and a loop. For example, FIG. 10B shows a latching member 75, generally configured as a cylinder or cylindrical rod, including a latching feature 74 generally configured as an undercut portion or groove defined by surface 76. A shoulder or nose 73 defines a catch face configured to be engageable with a retaining member. A second shoulder or nose 77 may also be defined by the latching feature 74, which may function similar to the shoulder 57 of the latching feature 55, as described previously herein. A nose portion 72, which may be defined by a chamfer, rounded portion or other modified edge 71 to facilitate the sliding movement of the latching member 75 from a retracted to a protracted position. FIG. 10C shows another example of a latching member 85, generally configured as a plate or bolt including a latching feature 88 generally configured as a clevis or loop 88 defining an opening 84, wherein the opening 84 is defined by a surface 86. A shoulder or nose 83 defines a catch face configured to be engageable with a retaining member. A second shoulder or nose 87 may also be defined by the latching feature 85, which may function similar to the shoulder 57 discussed for the latching feature 55. The nose portion 82 of the latching member 85 may be further defined by a chamfered or rounded portion 81, to facilitate smooth movement of the latching member 85 from a retracted to a protracted position.

It would be further understood that the configuration of the carrier 41 and the receiver 40 would be modified to accommodate the configuration of the latching member, the latching member and the retaining member, and that multiple combinations of the various configurations of the latching members and the retaining members are possible. For example, the latching member 75 shown in FIG. 10A would be accommodated by providing passages 48, 49 in the respective carrier and retainer which are also cylindrical, such that the latching member 75 could slidably engage with the passages 48, 49 when protracting and retracting. Similarly, receiver 40 may be configured to accommodate the retaining member 67 shown in FIG. 9C, such that the hook portion 68 and/or the nose portion 69 may engage the catch face 53, 73, 83 of the respective latching member combined with the retaining member 67 to configure the latching system.

Using a non-limiting example of the retaining member or the pawl 67 shown in 9C in combination with the latching member or the rod 75 shown in FIG. 10B, the pawl 67 may be combined in a first example with the rod 75 in a first orientation where the pawl 67 is aligned parallel to the axis of the rod 75 such that the nose portion 69 of the pawl 67 is selectively engageable with the shoulder 73 of the rod 75. In another orientation, the pawl 67 may be aligned perpendicular to the axis of the rod 75 such that the hook portion 68 of the pawl 67 engages the outer diameter of the undercut portion of the rod 75, e.g., the hook of the pawl engages the groove, e.g., the latching feature 74.

Similarly, the pawl 67 may be configured in combination with the latching member or clevis 85 shown in FIG. 10C. In a first orientation, the pawl 67 may be oriented parallel with the longitudinal axis of clevis 85 so as to engage the nose 69 with the shoulder portion 83 or to engage the hook portion 68 with the opening 84, and such that the hook portion 68 is proximate to the end 82 of loop 88. The pawl 67 may be, in another orientation, oriented perpendicular to the longitudinal axis of clevis 85 such that the nose 69 of pawl 67 engages the opening 84, and such that the hook portion 68 is proximate to a side of loop 88. These examples are illustrative and are not to be limiting of the multiple combinations, orientations and configurations of the latching members and the retaining members which are possible.

The latching system and method described herein are illustrated using an example of a vehicle door latching system. The example of a vehicle door latching system shown in FIGS. 1-10C is intended to be non-limiting. The latching system and method described herein may be configured to provide a latching force between a vehicle door and a door interface portion, where the door may be, for example, a front side door, a rear side door, a back door, a cargo-type door, a hinged door or a sliding door, as those terms are commonly understood. The door interface portion may be a portion of a vehicle body, which may be any portion of the door frame including, for example, generally horizontal portions of the frame such as the head or foot rail, wherein the latching elements may be operatively attached to the door and door interface portion and oriented accordingly to provide a latching force, or may be a portion of another vehicle door to which the door is latched or sealed, as previously discussed. Where the latching system is configured to provide a latching force between a vehicle door and another vehicle door, the doors may be configured, for example, as cargo-type doors or other paired opposing hinge doors, where one door seals to the other door, and with no body pillar between the doors, to close out a continuous door opening, e.g., a door opening with no body pillar, such as a B-pillar, between the vehicle doors. The paired opposing hinged doors may be dependent or independent. As used herein, the term "dependent" refers to doors with opposing hinges on the same side of a vehicle and with no body pillar between the doors, such that the doors seal to one another, and such that a first door, usually the front door of a pair of opposing hinged doors located on the side of a vehicle, must be opened before the second door, usually the rear door of a pair of side doors, can be opened, and the second or rear door must then be closed before the first or front door can be closed. As used herein, the term "independent" refers to first and second doors which are "independently" openable and closable, which means that each can be opened or closed regardless of the position of the other vehicle door, such that each of the doors may be opened and closed in any order or simultaneously.

Further, the latching system and method described herein may be configured to provide a latching force between any first member configured to be latched to a second member, and may be utilized in non-vehicle door applications where a latching system which may be subjected to, for example, impact loads which may require providing an opening force to be resisted by an actuable latching force selectively provided during higher loading event.

While the best modes for carrying out the invention have been described in detail, those familiar with the art to which this invention relates will recognize various alternative designs and embodiments for practicing the invention within the scope of the appended claims.

The invention claimed is:

1. A door latching system for a vehicle including an openable and closeable door and a portion interfacing with the door, the system comprising:
   a first component defining a first passage and adapted to be operatively connected to and contained in one of the door and the portion interfacing with the door;
   a second component defining a second passage and adapted to be operatively connected to and contained in the other of the door and the portion interfacing with the door;
   a latching member fully contained in the first passage in a retracted position and actuable to slidably protrude from the first passage into the second passage in a protracted position in response to a triggering event;
   a latching feature defined by the latching member;
   a retaining member operatively connected to one of the first component and the second component;
   wherein the retaining member is configured to be selectively engageable with the latching feature when the latching member is in the protracted position; and
   wherein the latching member in the protracted position engages the first component and the second component to operatively latch the door to the portion interfacing with the door.

2. The door latching system of claim 1,
   wherein the triggering event is one of an impact event, an indication of an impact event, and a prediction of an impact event; and
   wherein the system is configured such that operatively latching the door to the portion interfacing with the door provides a latching force to resist an opening force resultant from the impact event.

3. The door latching system of claim 1, further including:
   at least one sensor in operative communication with the door latching system, wherein the triggering event is defined by a signal from the at least one sensor.

4. The door latching system of claim 1,
   wherein the vehicle defines a continuous access opening;
   wherein the portion interfacing with the door is at least partially defined by a second door; and
   wherein the door and the a second door are operatively attached to the vehicle defining the access opening such that the doors are configured to be independently openable and closeable with respect to each other and substantially cover the access opening when closed.

5. The door latching system of claim 1,
   wherein the latching feature is configured as one of a recess, a cavity, a slot, a groove, an undercut, a hole, an opening, and a loop; and
   wherein the retaining member is configured as one of a catch, a wedge, a lever, a bolt, a pin, a hook, and a pawl.

6. The door latching system of claim 1, further comprising:
   a retracting member operatively connected to one of the first component and the second component; wherein the retracting member is configured to selectively engage with the latching member when the latching member is in the retracted position;
   an actuator in communication with the retracting member; and
   wherein the actuator is configured to selectively disengage the retracting member from the latching member in response to the triggering event.

7. The door latching system of claim 1, further comprising an actuator configured to actuate the latching member to move to the protracted position when the actuator is activated; and
   wherein the actuator is activated in response to the triggering event.

8. The door latching system of claim 7, wherein the actuator is configured as one of a pyrotechnic, a spring-loaded, a mechanical, an electromechanical, an electromagnetic, and an electronic actuator.

9. The door latching system of claim 1, further comprising:
   an actuator in communication with the latching member;
   wherein the latching member is configured to be movable from the protracted position to the retracted position by the actuator in response to a releasing event.

10. The door latching system of claim 1,
    wherein the door defines a first latch face, and the portion interfacing with the door defines a second latch face;
    wherein when the door and the portion interfacing with the door are in a closed position with respect to each other, the first and second latch faces define an opening therebetween; and
    wherein in a non-actuated condition, the first component, the second component and the latching member do not substantially protrude from the respective latch face into the opening.

11. A method of latching a vehicle door and a portion interfacing with the door of the vehicle, the method comprising:
    providing a triggering event;
    slidably moving a latching member from a retracted position to a protracted position in response to the triggering event;

wherein in the retracted position the latching member is fully contained in a first passage defined by a first component, and in the protracted position the latching member slidably protrudes from the first passage to engage a second passage defined by a second component;

wherein the first component is operatively attached to and contained in one of the vehicle door and the portion interfacing with the door, and the second component is operatively attached to and contained in the other of the vehicle door and the portion interfacing with the door;

engaging the first component and the second component to operatively latch the door to the portion interfacing with the door;

engaging a latching feature and a retainer member;

wherein the latching feature is defined by the latching member; and wherein the retainer member is operatively connected to one of the first component and the second component.

12. The method of claim 11, wherein providing the triggering event further comprises:

receiving a signal from at least one sensor, wherein the triggering event is defined by one or more signals from the at least one sensor.

13. The method of claim 11, wherein the latching feature is configured as one of a recess, a cavity, a slot, a groove, an undercut, a hole, an opening, and a loop; and wherein the retainer member is configured as one of a catch, a wedge, a lever, a bolt, a pin, a hook, and a pawl.

14. The method of claim 11, wherein actuating the latching member in response to the triggering event further comprises:

activating an actuator in operative communication with the latching member;

wherein the actuator is configured to cause the latching member to move from the retracted position to the protracted position when the actuator is activated;

wherein the actuator is activated in response to the triggering event; and wherein the actuator is configured as one of a pyrotechnic, a spring-loaded, a mechanical, an electromechanical, an electromagnetic, and an electronic actuator.

15. The method of claim 11, further comprising:

providing a releasing event;

wherein the latching member is in communication with an actuator and configured to be movable from the protracted position to the retracted position by the actuator in response to the releasing event;

moving the latching member from a protracted position to a retracted position in response to the releasing event; and disengaging the first component and the second component to operatively unlatch the door and the door interface portion.

16. A vehicle defining an access opening, the vehicle comprising:

a door arranged to selectively open and close at least a portion of the access opening;

a first component operatively connected to one of the door and a portion of the vehicle interfacing with the door;

a latching member defining a latching feature;

wherein the latching member is actuable in response to a triggering event;

wherein the latching member is configured to move from a retracted position to a protracted position when actuated;

a second component operatively connected to the other of the door and the portion interfacing with the door;

a retaining member operatively connected to the second component;

wherein the retaining member is configured to be selectively engageable with the latching feature when the latching member is in the protracted position;

wherein the door defines a first latch face, and the portion interfacing with the door defines a second latch face;

wherein when the door and the portion interfacing with the door are in a closed position with respect to each other, the first and second latch faces define an opening therebetween;

wherein in a non-actuated condition, the first component, the second component, and the latching member do not substantially protrude from the respective latch face and into the opening; and wherein the latching member engages the first component and the second component when the latching member is in the protracted position to operatively latch the door and the portion interfacing with the door.

17. The vehicle of claim 16, further comprising:

an actuator configured to actuate the latching member to move to the protracted position when the actuator is activated;

wherein the actuator is activated in response to the triggering event;

wherein the triggering event is one of an impact event, an indication of an impact event, and a prediction of an impact event; and wherein the system is configured such that operatively latching the door to the portion interfacing with the door provides a latching force to resist a force resultant from the impact event.

18. The vehicle of claim 16, further comprising:

a second door;

wherein the access opening is continuous;

wherein the portion interfacing with the door at least partially defines the second door; and wherein the door and the second door are operatively attached to the vehicle such that the doors are configured to be independently openable and closeable with respect to each other and substantially cover the access opening when closed.

* * * * *